United States Patent [19]
Hausrath

[11] Patent Number: 5,941,592
[45] Date of Patent: Aug. 24, 1999

[54] FOLDABLE ROOF FOR AN AUTOMOBILE WITH A FOLDABLE ROOF SURFACE PART

[75] Inventor: Udo Hausrath, Starnberg, Germany

[73] Assignee: HS Products AG Systemtechnik und Produktmanagement, Krailling, Germany

[21] Appl. No.: 08/731,429

[22] Filed: Oct. 15, 1996

[30] Foreign Application Priority Data

Oct. 12, 1995 [DE] Germany .......................... 195 38 051

[51] Int. Cl.⁶ ....................................................... B60J 7/12
[52] U.S. Cl. ....................................................... 296/107.14
[58] Field of Search .................................. 296/216, 219, 296/220, 223, 107.15, 107.13, 107.14, 107.19

[56] References Cited

U.S. PATENT DOCUMENTS

| | | | |
|---|---|---|---|
| 2,992,041 | 7/1961 | McClure | 296/219 |
| 3,690,722 | 9/1972 | Bakewicz et al. | 296/219 |
| 4,696,511 | 9/1987 | Laville et al. | 296/220 |
| 4,968,089 | 11/1990 | Murai et al. | 296/219 |
| 5,052,747 | 10/1991 | Kubota et al. | 296/219 |

FOREIGN PATENT DOCUMENTS

| | | | |
|---|---|---|---|
| 603834 | 6/1994 | European Pat. Off. | 296/219 |
| 406239141 | 8/1994 | Japan | 296/219 |
| 2240519 | 8/1991 | United Kingdom | 296/220 |

*Primary Examiner*—Dennis H. Pedder
*Attorney, Agent, or Firm*—Evenson, McKeown, Edwards & Lenahan, P.L.L.C.

[57] ABSTRACT

A foldable roof for an automobile includes a foldable roof surface part which is held in the center between two lateral rigid struts. The respective lateral struts have at least two strut parts which can be displaced with respect to each other. Strut parts of a respective strut can be mounted so that they can be displaced with respect to each other.

7 Claims, 5 Drawing Sheets

FOLDABLE ROOF FOR AN AUTOMOBILE WITH A FOLDABLE ROOF SURFACE PART

The invention relates to a foldable roof for an automobile with a foldable roof surface part, which is held in the center between two lateral rigid struts.

Conventional foldable roofs for automobiles are guided in the center between two lateral rigid struts, which are formed by two lateral roof coverings. In the case of conventional foldable roofs, the foldable roof surface portion consists of a material web which, while the roof is being opened, is pushed towards the rear and at that time becomes folded. The two lateral roof struts or roof coverings remain in a fixed location on the vehicle structure and serve for guiding and supporting the foldable roof surface part during opening and closing of the roof.

It is the task of the invention to create a foldable roof of the initially mentioned type wherein the automobile is similar to a convertible when the foldable roof surface part is in the folded state.

In accordance with the invention, this task is solved in that the respective struts consist of at least two strut parts which can be displaced with respect to each other.

Hereby it is achieved that, during the folding of the foldable roof surface part, the respective strut parts are displaced with respect to each other such that they are removed from their normal location and can be stowed away in the rear portion of the automobile structure. By pushing the struts together and by displacing the struts toward the rear portion of the automobile, not only is a roof opening created, but the entire roof assembly above the passenger space is removed and, possibly after folding the foldable roof surface part and simultaneous pushing together the strut parts in the rear portion of the automobile assembly, can be lowered into a covered compartment, as is the case with a convertible. Furthermore, it is possible to remove the pushed together strut parts, together with the folded roof surface part, from the vehicle structure after a locking device has been released. In this way, a completely opened up passenger space is obtained in the automobile, as is the case with a convertible However, the pushed together roof assembly may be left on the outside of the automobile assembly without being lowered into the covered compartment.

As a rule, in the case of a foldable roof surface part, a foldable material web may be involved which, while the strut parts are pushed against each other, is folded in the direction towards the rear of the automobile structure.

However, the foldable roof surface part may be formed from several rigid roof surface pieces which, when the strut parts are pushed together, are pushed on top of each other, so that this results also in a complete opening of the passenger space in upward direction.

During the displacement of the strut parts towards the rear of the automobile during opening of the roof, as well as during displacement towards the front during closing of the roof, the strut parts of the two struts can preferably be displaced with respect to each other synchronously.

The strut parts of each respective strut are preferably arranged such that they can be displaced relative to one another.

Due to the fact that the strut parts which can be displaced with respect to each other are supported during the displacement at the rear portion of the strut on the vehicle structure, it is possible for all roof components above the upper window edges, i.e. the central foldable roof surface part as well as the two rigid lateral struts which may contain the roof coverings, to be moved completely into the rear area of the automobile assembly.

In order to displace the strut parts with respect to each other, the strut parts may have guide bar brackets in which parts of the respectively adjacent strut part are guided essentially in the longitudinal direction of the strut parts. Furthermore, by means of the guide bar brackets, a movement of the strut parts diagonally to the longitudinal direction may be created, so that the strut parts are in the form of a stack, one on top of the other, in the pushed together state while the roof is open.

An embodiment of the invention is explained in greater detail on the basis of the figures, wherein FIG. 1 shows a plan view of one of the two lateral struts;

Figure 1:
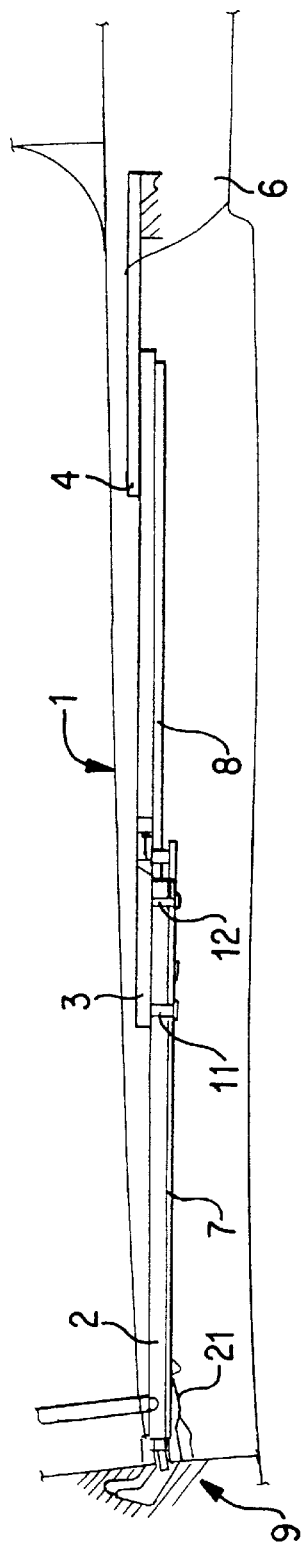

The foldable roof for an automobile, as shown in the figures, has two struts (1) of which one strut is shown. These two struts may be a component of the lateral roof coverings. The two struts serve for guiding a foldable roof surface part (5), which is guided between them in the longitudinal direction of the automobile. In the example shown, this foldable roof surface part (5) is formed by a foldable material web. However, it may also consist of rigid roof surface pieces, which can be stacked one on top of the other.

Each of the two struts (1) is formed from several strut parts (2, 3 and 4) which can be displaced with respect to each other. In the example shown, a front strut part (2), a central strut part (3) and a rear strut part (4) are provided for each of the two struts (1).

The strut parts can be displaced essentially with respect to each other in their longitudinal directions. In the example shown, the rear strut part (4) is attached at the automobile assembly, i.e. on a C-column (6) of the automobile assembly. The central strut part (3) is mounted in a displaceable manner on this rear strut part (4). For this purpose, the central strut part (3) has the guide bar bracket (8). This guide bar bracket (8) is constructed similarly to the guide bar bracket (7) on the front strut part (2) with which the strut part (2) is mounted on the strut part (3), which can also be displaced longitudinally. At the central strut part (3), the guide pins (11 and 12) are attached which extend into the guide bar bracket (7) at the front strut part (2). The same arrangement exists between the rear strut part (4) and the central strut part (3), mounted thereon in a displaceable manner. Guide pins, which are not shown in greater detail, are attached at the rear strut part (4) and extend into the guide bar bracket (8) at the central strut part (3).

The guide bar brackets (7 and 8) have a guide bar bracket part which extends essentially in longitudinal direction. Furthermore, the guide bar brackets (7 and 8) have guide bar bracket parts (13 and 14) which extend across the longitudinal direction. When the roof is closed, the guide pins (11 and 12) penetrate into the respective ends of the transverse guide bar bracket parts (13 and 14), which serve as stops.

When the roof is in the closed position, the two struts (1) are anchored at their front free ends, with the aid of the locking arrangements (9), of which one is shown in FIG. 1, to the automobile assembly in the upper area of the A-column or in the lateral area of the upper windshield frame. Each of the two locking arrangements (9) has a catch lever (15). The catch lever (15) is sealed about a pivot axis (16) at the front end of the front strut part (2). An operating device (10), which is attached at the front end, approximately in the middle of the foldable roof surface part (5), serves the purpose of actuating or pivoting the catch lever (15). The operating device (10) synchronously acts on both locking devices (9) of the struts (1). The operating device (10) may, as is conventional, have a swivel part (18) which is provided with a control grip (17) which, via connecting rods (19), influences the operation or swiveling of the catch levers (15) about their axes (16) for releasing and locking purposes.

Figure 2:
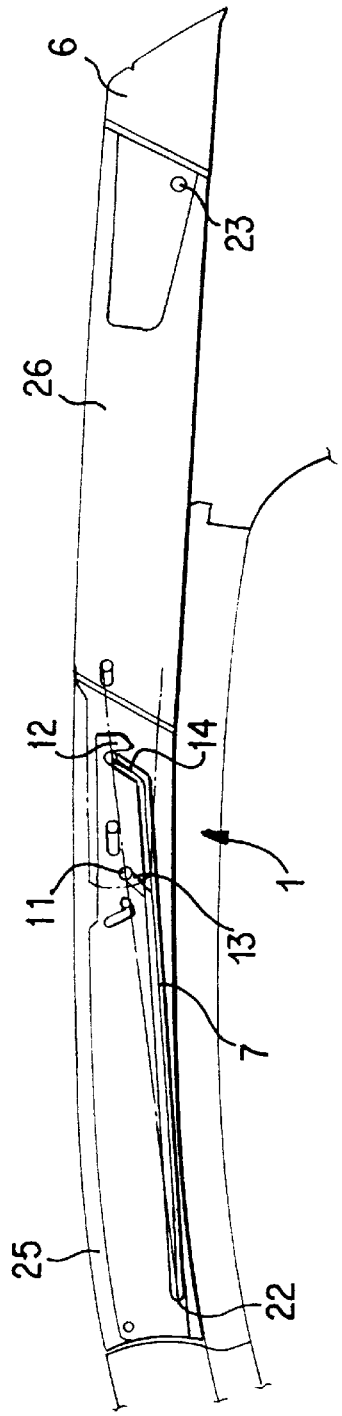
FIG. 2 shows a lateral view of the strut of FIG. 1.

In the FIGS. 1 and 2, the components of the foldable roof are shown in those positions in which the roof is closed. The catch levers (15) of the locking devices (9) grip into corresponding recesses (20) on the automobile assembly. In order to open the roof, by turning the swivel part (18), the catch levers (15) are pivoted out of their locking positions wherein, via a carrier element (21), the pivot movement is transferred to the plate-like guide bar bracket (7) of the front strut (2). At that time, the strut part (2), attached at the guide bar bracket (7), carries out a lifting movement vis-a-vis the central strut part (3). At that time, the guide pins (11 and 12) are guided along the guide bar bracket parts (13 and 14) extending transverse to the longitudinal direction. During further backward displacement, the front strut part (2) with its guide bar bracket (7) moves diagonally upward via the central strut part (3) until the respective guide pins (11) abut against the front end stop (22) of the guide bar bracket part extending in longitudinal direction. During further displacement of the roof assembly backwards, this process between the central strut part (3) and the rear strut part (4) is repeated until the strut parts assume the configuration shown in FIG. 3.

Figure 3:
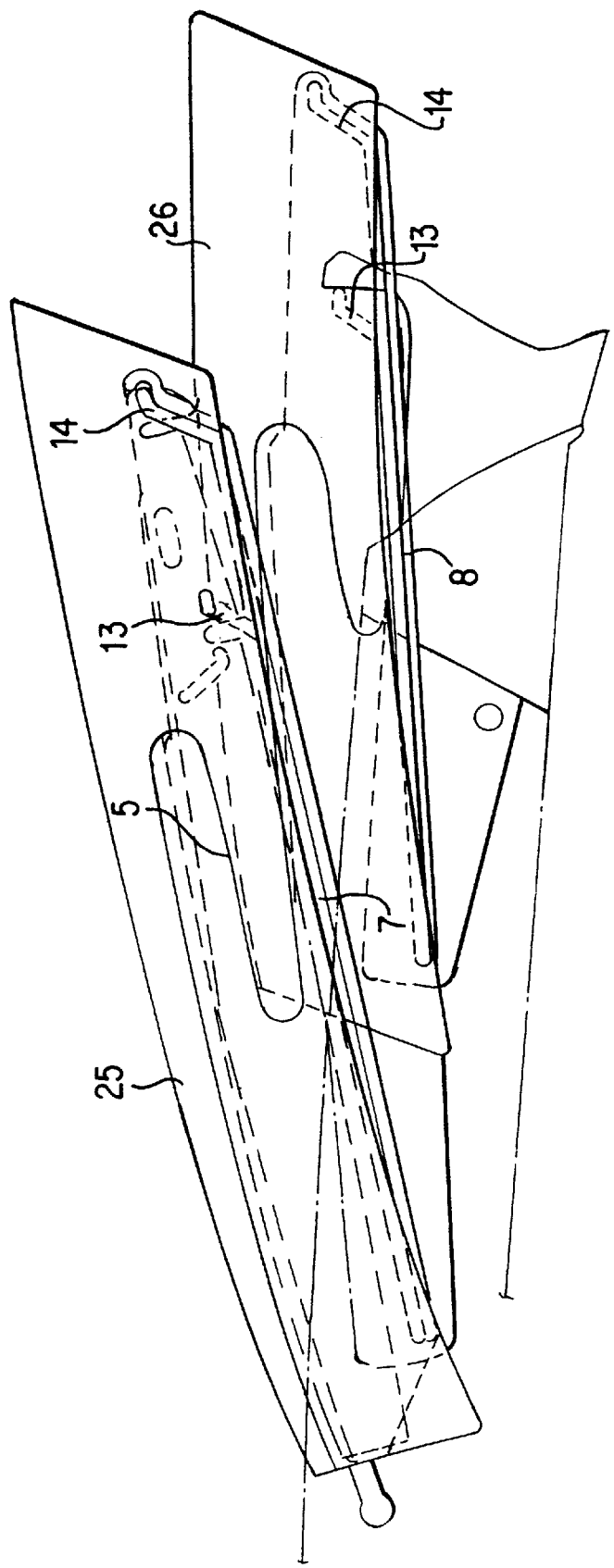
FIG. 3 shows the strut in the pushed-together state while the roof is folded.

During this rearward displacement of the strut parts (2 and 3), the foldable roof surface part (5), held between them, is simultaneously folded, for example, in the form of a folded material web, as shown in FIG. 3.

In the arrangement shown in FIG. 3, the strut parts (2, 3 and 4) may, for example, be released and removed from the automobile assembly by releasing the locking arrangement (23). However, it is also possible, after the locking arrangement (23) has been released, to lower the strut parts which are pushed together and the folded roof surface part (6), into a rear compartment in the vehicle structure. The automobile then has the appearance of a convertible, since all roof elements above the passenger space are removed.

Figure 4:
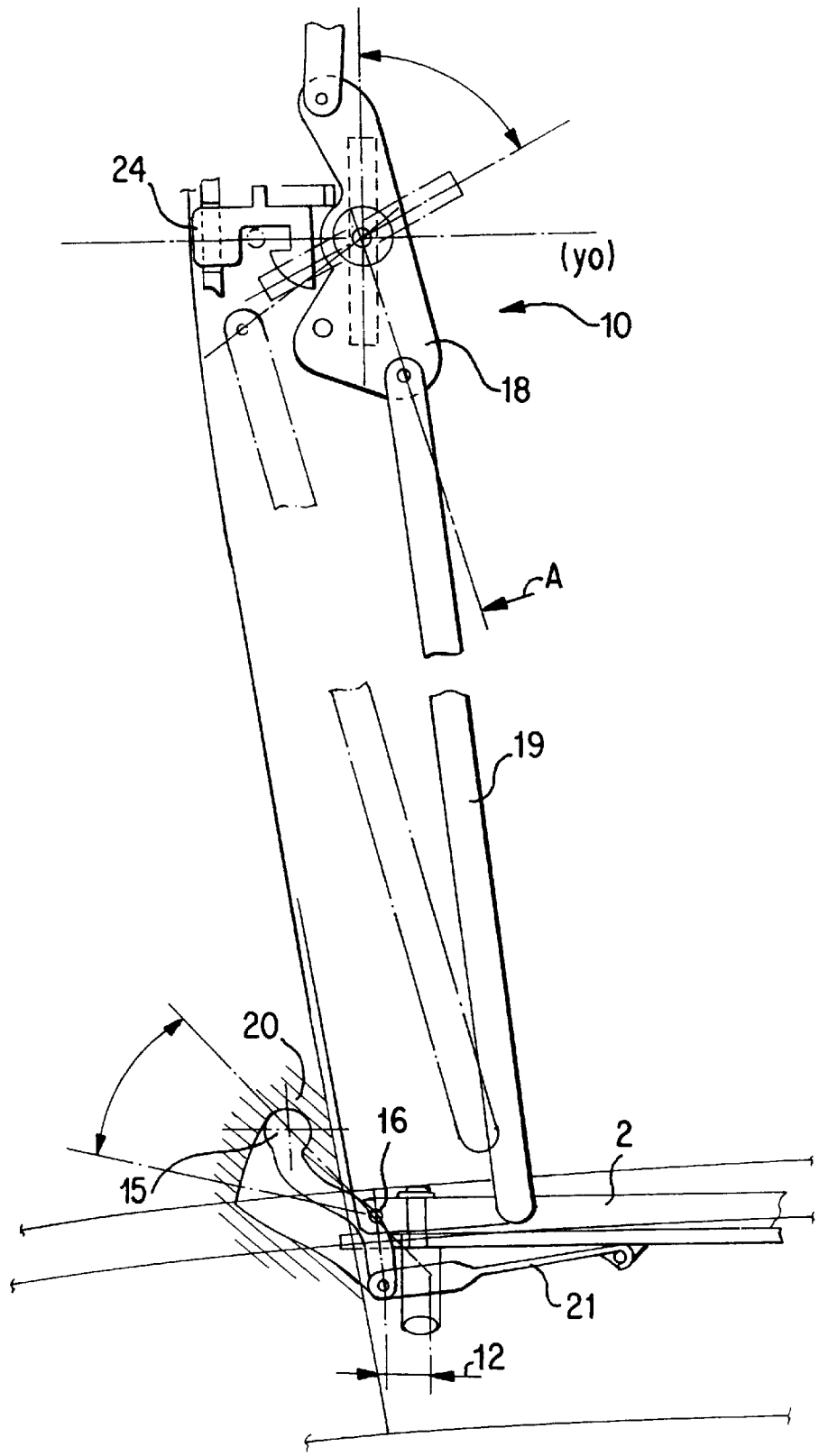
FIG. 4 shows a locking device for the strut in plan view.
Figure 5:
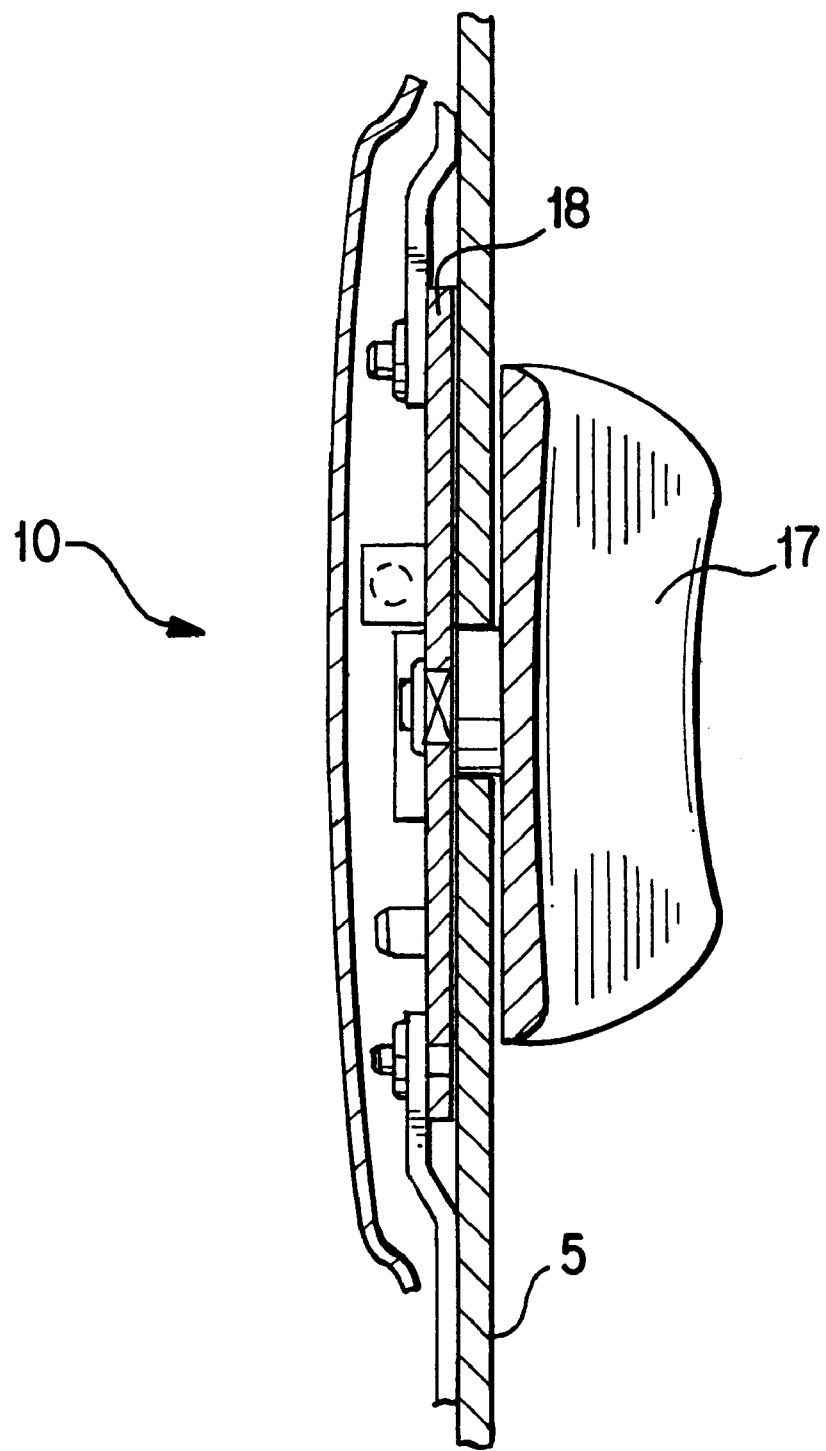
FIG. 5 shows in cross section an operating arrangement for the locking device, which is also shown in plan view in FIG. 4.

During closing of the roof, the strut parts (2 and 3) are pushed toward the front, in the direction opposite to the position shown in FIG. 3, at which point the guide pins (11 and 12) are guided in the guide bar brackets (7 and 8) until, after they have been guided through the transverse guide bar bracket parts (13 and 14), they reach their final positions shown in the FIGS. 1 and 2. The final closing and locking of the roof may take place when a securing element (24) is put in place via a roof edge with a stop, as shown in FIG. 4. By pivoting the swivel part (18) with the aid of the control grip (17), the catch levers (15) of the locking devices (9) are then brought into the locking position shown in FIG. 1.

Figure 6:
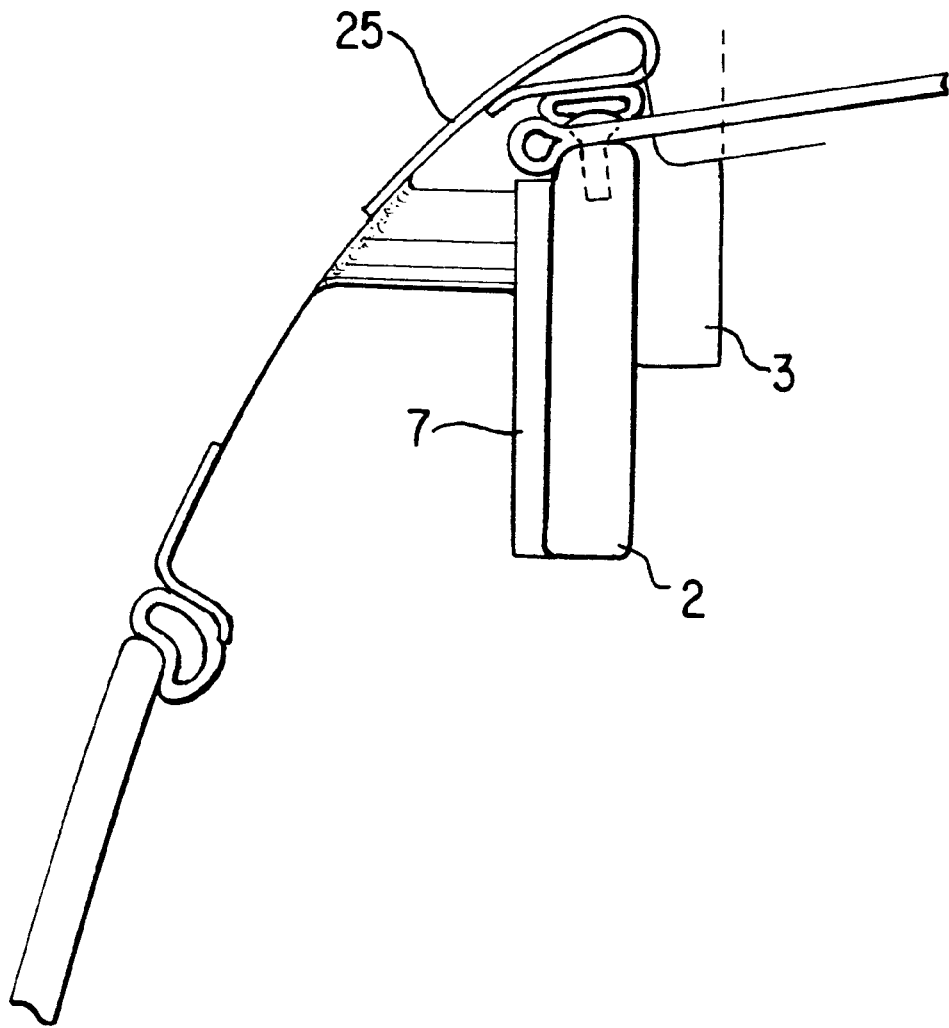
FIG. 6 shows a front view of a strut.

The opening and closing of the roof can be made easier especially in connection with those automobiles in which the front portion of the roof construction is wider than the rear portion of the roof construction. In this case, during opening of the roof, the strut parts (2, 3), arranged side by side in front view (FIG. 6), and the lateral roof covering (25, 26) attached thereon (FIG. 2), [as well as] the guide bar brackets and the strut parts spread apart in a fan-like manner, so that the path for opening is cleared. During closing, the opposite sequence of movements takes place.

I claim:

1. A foldable roof for an automobile comprising:

two lateral rigid struts, each of said lateral rigid struts including at least two strut parts comprising a front strut part and a rear strut part which are displaceable, with respect to each other and with the front strut part having a locking device engageable with a supporting body portion of the automobile before the displacement;

a foldable roof surface part which is held centrally between said two lateral rigid struts; and a slotted guide bar bracket provided on at least one of the front and rear strut parts within which engaging guide pins of the other strut part is guided so as to be movable in their longitudinal directions;

wherein said slotted guide bar bracket has guide bar bracket part slot extensions which extend transverse to the longitudinal directions of the strut parts so that, during the displacement, the strut parts respectively carry out a lifting movement relative to each other transverse to displacement in the longitudinal directions of the strut parts so as to overlay one another with the front strut part having a front free end out of contact with the supporting body in the displaced position.

2. A foldable roof in accordance with claim 1, wherein the at least two strut parts are supported during the displacement at the rear portion of one of the two lateral rigid struts on the vehicle structures via a locking arrangement.

3. A foldable roof in accordance with claim 1, wherein the foldable roof surface part and the at least two strut parts are releasably attached to the supporting body portion via a locking arrangement.

4. A foldable roof in accordance with claim 1, wherein the rear strut part includes a central strut part, and wherein the front strut part is movably supported on the central strut part and the central strut part is movably supported at the rear strut part via said pins and slot.

5. A foldable roof in accordance with claim 4, wherein the rear strut part is supported in a stationary manner on the vehicle structure during said displacement via a locking arrangement.

6. A foldable roof in accordance with claim 1, and further comprising two locking devices for locking each front strut part to the vehicle structure.

7. A foldable roof in accordance with claim 6, and further comprising a common operating device provided on a front portion of the roof surface part for operating the locking devices.

* * * * *